(12) United States Patent
Nance et al.

(10) Patent No.: US 8,837,672 B2
(45) Date of Patent: Sep. 16, 2014

(54) CONCEALED IDENTIFICATION SYMBOLS AND NONDESTRUCTIVE DETERMINATION OF THE IDENTIFICATION SYMBOLS

(75) Inventors: Thomas A. Nance, Aiken, SC (US); Kenneth M. Gibbs, Clarks Hill, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 221 days.

(21) Appl. No.: 13/465,626

(22) Filed: May 7, 2012

(65) Prior Publication Data

US 2013/0294579 A1    Nov. 7, 2013

(51) Int. Cl.
*G01N 23/04*    (2006.01)

(52) U.S. Cl.
USPC ................. 378/62; 378/4; 378/162; 378/210

(58) Field of Classification Search
USPC ........................ 378/4, 21, 62, 204, 210, 162
See application file for complete search history.

(56) References Cited

U.S. PATENT DOCUMENTS

| 5,044,955 A | 9/1991 | Jagmin |
| 5,509,805 A | 4/1996 | Jagmin |
| 2007/0058775 A1* | 3/2007 | Benderly ........................ 378/45 |
| 2007/0121181 A1* | 5/2007 | Moon et al. ........................ 359/2 |

OTHER PUBLICATIONS

Cobra Jet NJ, "Wondering about VIN numbers . . . how many on a car?", Sep. 4, 2003, Retrieved from the Internet: <URL:http://forums.corral.net/forums/general-mustang-tech/360252-wondering-about-vin-numbers-how-many-car.html>.*

* cited by examiner

*Primary Examiner* — Glen Kao
(74) *Attorney, Agent, or Firm* — Dority & Manning, P.A.

(57) ABSTRACT

The concealing of one or more identification symbols into a target object and the subsequent determination or reading of such symbols through non-destructive testing is described. The symbols can be concealed in a manner so that they are not visible to the human eye and/or cannot be readily revealed to the human eye without damage or destruction of the target object. The identification symbols can be determined after concealment by e.g., the compilation of multiple X-ray images. As such, the present invention can also provide e.g., a deterrent to theft and the recovery of lost or stolen objects.

14 Claims, 8 Drawing Sheets

CONCEALED IDENTIFICATION SYMBOLS AND NONDESTRUCTIVE DETERMINATION OF THE IDENTIFICATION SYMBOLS

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The subject matter of the present disclosure relates generally to concealed identification symbols and to the nondestructive determination of the same.

BACKGROUND OF THE INVENTION

Conventionally, identification symbols have been used on a variety of objects to provide a positive identification of the object that can be used e.g., in theft recovery, loss recovery, inventory control, tagging, tracking, and other applications as well. For example, automobiles are commonly provided with vehicle identification numbers (VINs) located in view near a bottom edge of the front windshield. The VIN is useful e.g., in conveying title, tracking, insuring, recovery after theft, etc. Guns are also commonly provided with serial numbers that can be used for similar purposes. Many consumer devices are also provided with serial numbers for purposes that include warranty protection and theft recovery.

A common problem with conventional methods is that the identification symbols can be readily located and/or removed. In the case of a gun, for example, the serial number can be removed by grinding or filing the barrel at a position where the serial number is located. A VIN can also be removed, altered, or replaced. With consumer devices such as e.g., a television or appliance, removal of the serial number may be as simple as locating the rear of the device and removing a tag or plate. Of course, once the identification symbols are removed, positive identification of the device for recovery after a loss or theft may not be possible. In addition, the deterrent effect against theft is reduced where an identification symbol can be readily removed or altered.

Conventional methods, such as e.g., acid etching and magnetic particle testing, do exist for the recovery of identification symbols such as serial numbers where such were placed externally on metal surfaces that have been filed or ground. However, these methods typically only allow recovery of identification symbols that were created by engraving or stamping and where only shallow grinding or filing has been attempted for removal. These methods are usually ineffective against machined or laser etched surfaces that do not have deep metal deformation or against surfaces where deep destructive filing or grinding has occurred.

Accordingly, a method for concealing one or more identification symbols into an object would be useful to not allow simple non-invasive removal of the symbols without the destruction of the object or disassembly of the object and loss of its usefulness. Furthermore a method that can be used to read or determine such identification symbols without destroying the object would be particularly useful. An object or device incorporating concealed identification symbols that can be later determined (e.g., read or revealed) through nondestructive testing would also be useful.

BRIEF DESCRIPTION OF THE INVENTION

The present invention provides for concealing one or more identification symbols into a target object and for the subsequent determination of such symbols through non-destructive testing. The symbols can be concealed in a manner so that they are not visible to the human eye and/or cannot be readily revealed to the human eye without damage or destruction of the target object. The identification symbols can be determined after concealment by e.g., the compilation of multiple X-ray images. As such, in addition to identification, the present invention can also provide a deterrent to theft and assist in the recovery of lost or stolen articles. Additional aspects and advantages of the invention will be set forth in part in the following description, or may be obvious from the description, or may be learned through practice of the invention.

In one exemplary aspect, the present invention provides methods of concealed identification. The methods include the steps of embedding one or more identification symbols into the target object such that the one or more identification symbols are not visible to the human eye from the outside of the object, cannot be revealed without disassembling the object, and cannot be identified using a single X-ray image. Additional steps of the method include obtaining multiple X-ray images of the one or more identification symbols in the object; applying one or more computed tomographic reconstruction algorithms to multiple X-ray images from the step of obtaining; and, determining the identification symbols from the step of embedding using the results of the step of applying reconstruction algorithms.

In another exemplary embodiment, the present invention provides a system for concealed identification. The system includes a target object with one or more identification symbols embedded into the target object. The one or more identification symbols are not visible to the human eye from the outside of the target object, cannot be revealed without disassembling the target object, and cannot be identified using a single X-ray image.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
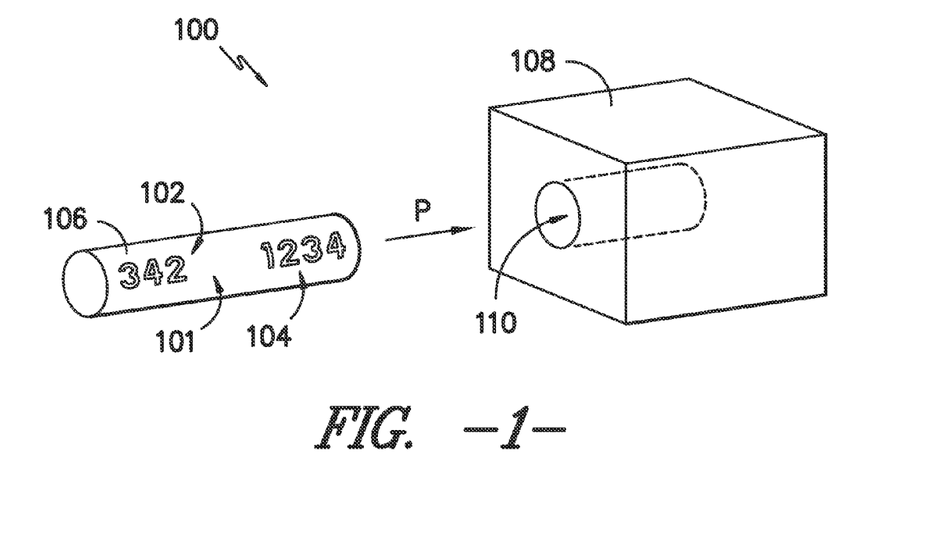
FIG. 1 provides an exploded perspective view of an exemplary device of the present invention in which a target object has been provided with multiple identification symbols.

FIG. 1 provides an exploded perspective view of an exemplary device of the present invention in which a target object 100 has been provided with multiple identification symbols 102 and 104. Although shown in FIG. 1 as numbers, the identification symbols could be alphanumeric symbols from any language, specially created characters, bar codes, and/or numerous other types of symbols that can be used for identification purposes. While multiple symbols are shown, a single symbol could be used as well.

Identification symbols 102 and 104 provide a system from which target object 100 can be positively identified. For example, identification symbols 102 and 104 may provide a unique code or identifier that is associated with target object 100, which could be a variety of different articles, devices, machines, or sub-component thereof etc., for which concealed identification according to the present invention is desired. For example, identification symbols 104 could be a VIN for an automobile, a serial number for a weapon or consumer product, and other devices as well. Accordingly, the identification symbols 104 can be recorded or logged for later access. If, for example, target object 100 is lost or stolen and then later recovered, a record of the identification symbols 104 can be used to associate target object 100 with its rightful owner.

For the exemplary embodiment of FIG. 1, symbols 102 and 104 are constructed from a first component 106 and a second component 108, which could be e.g., any two components of a device for which concealed identification is desired. Components 106 and 108 could be constructed from a variety of different materials such as e.g., metal, plastic, wood, and others depending upon e.g., the desired construction for target object 100. For example, the target object 100 could be a gun where first component 106 is a steel barrel and second component 108 is the gun's receiver. Alternatively, the assembled target object 100 could be a sub-component of a larger device. Using the teachings disclosed herein, one of skill in the art will understand that the present invention may be applied to numerous other examples as well.

Figure 2:
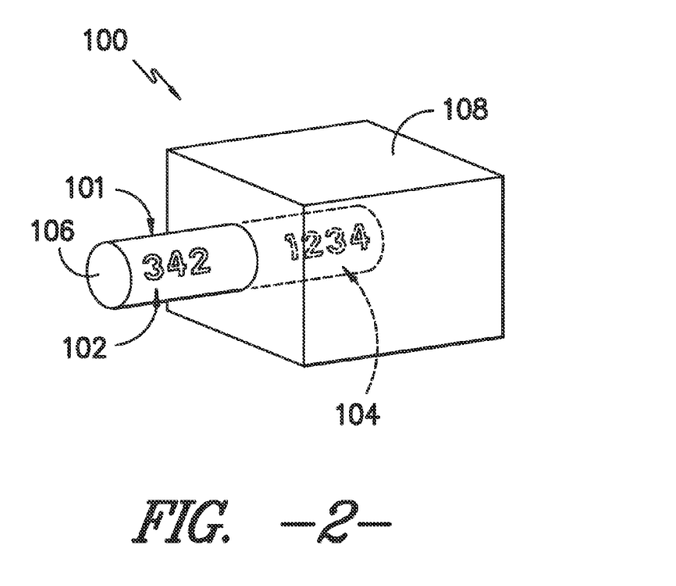
FIG. 2 provides an assembled perspective view of the exemplary device of FIG. 1. The result of the assembly shows both visible and concealed identification symbols.

FIG. 2 provides a perspective view of the assembled state of the exemplary target object 100 of FIG. 1. More particularly, first component 106 has been inserted into the opening 110 of second component 108 to provide the assembled target object 100, which may represent an entire device such as a gun (with barrel 106 inserted into receiver 108) or an assembled subcomponent of a larger device (such as two parts of the engine of an automobile). Regardless, FIG. 2 illustrates a press fit (arrow P) assembly of two parts where an interference fit has been used to assemble the target object 100 and, at the same time, provide for concealing the identification symbols 104 in a permanent manner. By way of example, first component 106 could also be welded, glued or otherwise permanently affixed into the opening 100 of second component 108.

As stated, once target object 100 is permanently assembled, identification symbols 104 are embedded within or behind second component 108 so that symbols 104 are concealed. Specifically, once assembled, identification symbols 104 are not visible to the human eye by simply viewing the outside of the object and cannot otherwise be determined by the naked human eye, if at all, without disassembling the target object 100 in a manner that disables and/or destroys target object 100.

Additionally, identification symbols 104 cannot be determined through use of a single X-ray image due to low contrast. As shown, identification symbols 104 were placed on the curved outer surface 101 of first component 106 by e.g., engraving into surface 101. As such, multiple X-ray images are required to determine identification symbols 104 once embedded within second component 108 as shown in FIG. 2. For example, multiple x-ray images must be taken about the cylindrical axis of first component 106. Then, one or more algorithms or other processing steps must be applied to compile the images so as to provide a readable depiction of identification symbols 104. For example, a tomographic reconstruction from multiple X-ray images may be undertaken.

The shape of components 106 and 108 shown in FIGS. 1 and 2 are provided by way of example only. As will be understood using the teachings disclosed herein, numerous other shapes and configurations may be applied to embed and thereby conceal identification symbols according to the present invention.

Additionally, first component 106 is also provided with a decoy identification symbol 102. As its name implies, decoy identification symbol 102 provides a ruse whereby e.g., a thief may believe that by removing symbol 102 all identifiers of target object 100 have been removed. Because the real identification symbols 104 are hidden from view, the thief is unaware that target object 100 can still be identified. Alternatively, identification symbol 102 could be used in conjunction with concealed identification symbols 104 to provide e.g., a two part code for identifying target object 100.

Figure 3:
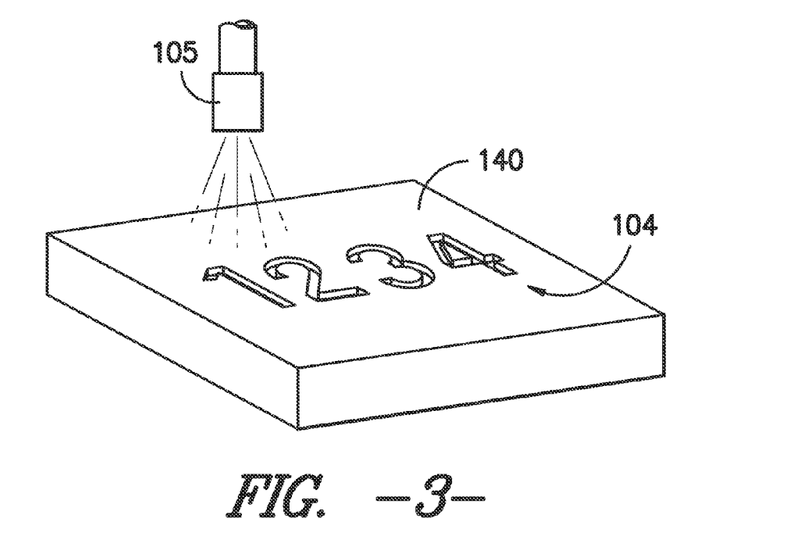
FIGS. 3 and 4 provide perspective views illustrating an exemplary method of the present invention. Vapor deposition can be utilized to provide higher contrast for non-destructive X-ray examination methods.
Figure 4:
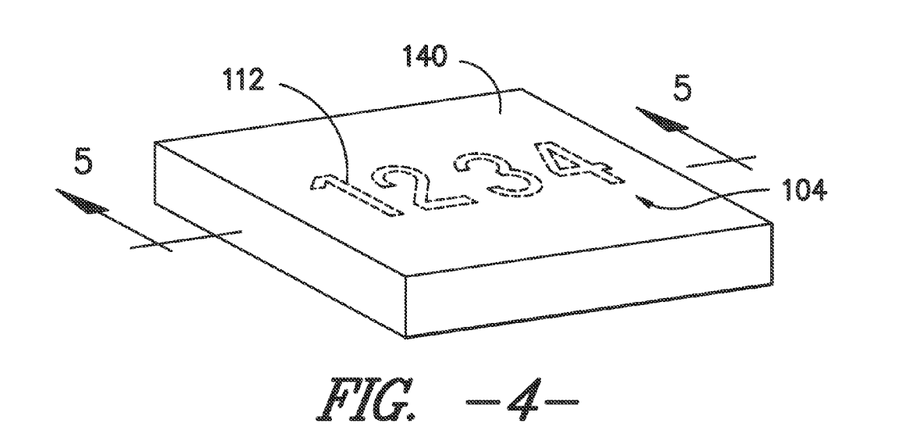
Figure 5:
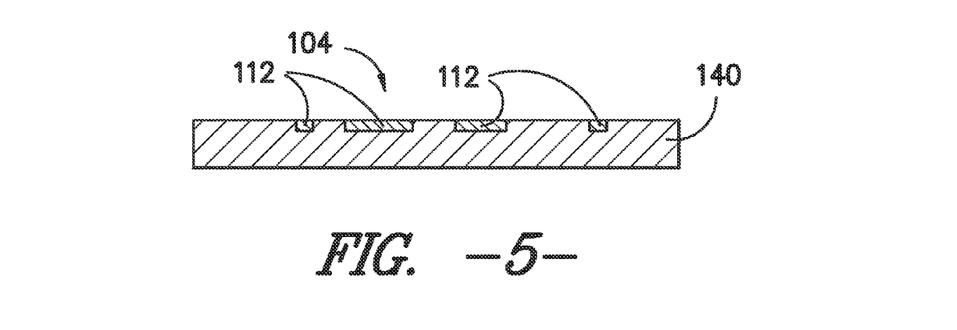
FIG. 5 provides a cross-sectional view of the exemplary embodiment of FIG. 4 as taken along line 5-5.
Figure 6:
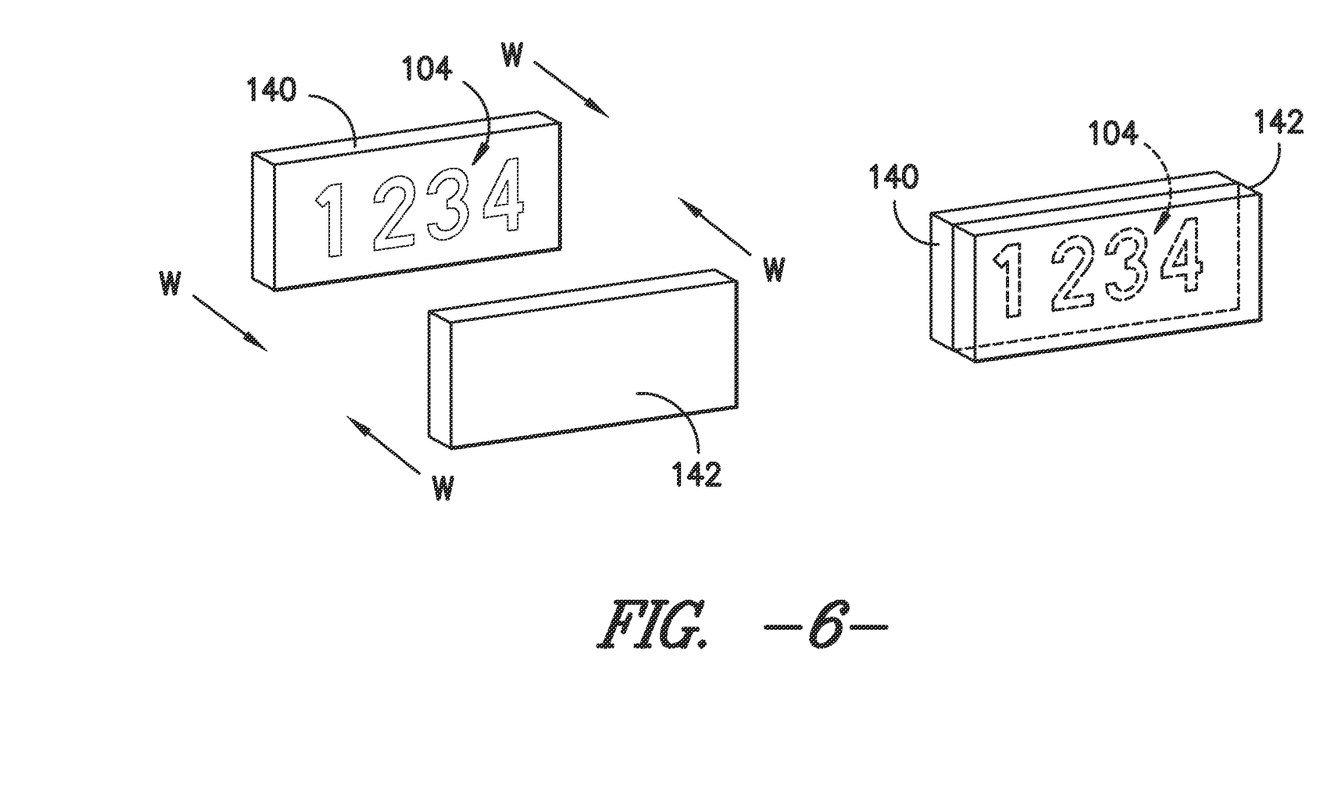
FIG. 6 provides a perspective view illustrating an additional exemplary embodiment for concealing identification symbols and another method of the present invention.

FIGS. 3 and 4 provide perspective views illustrating another exemplary embodiment and method of the present invention. More particularly, in FIG. 3 an applicator 105 is used to apply an X-ray contrasting agent 112 into an engraving of identification symbols 104 into the first plate 140. The X-ray contrasting agent could be, for example, lead, tungsten, or another material having a high atomic number. These materials could be applied as a powder into the engraving in first plate 140. As shown in the cross-sectional view of FIG. 5, the X-ray contrasting agent 112 fills the engravings and provides a more pronounced differentiation of X-ray image between steel and the contrasting agent than that of the image between steel and an air void. As such, during X-ray imaging of first plate 140, the X-ray contrasting agent facilitates the determination or reading of symbols 104. Although first plate 140 is shown as planar in FIGS. 3-5, a curved surface could be used as well. By way of additional example, the identification symbols 104 of the exemplary embodiment of FIGS. 1 and 2 could be constructed with an X-ray contrasting agent as well. As shown in FIG. 6, first plate 140 could also be welded (arrows W) to another plate 142 so as to embed identification symbols 104. The combined plates 140 and 142 can then be incorporated into a target object as a carrier of the identification symbols or the plates could form parts of the target object itself.

Figure 7:
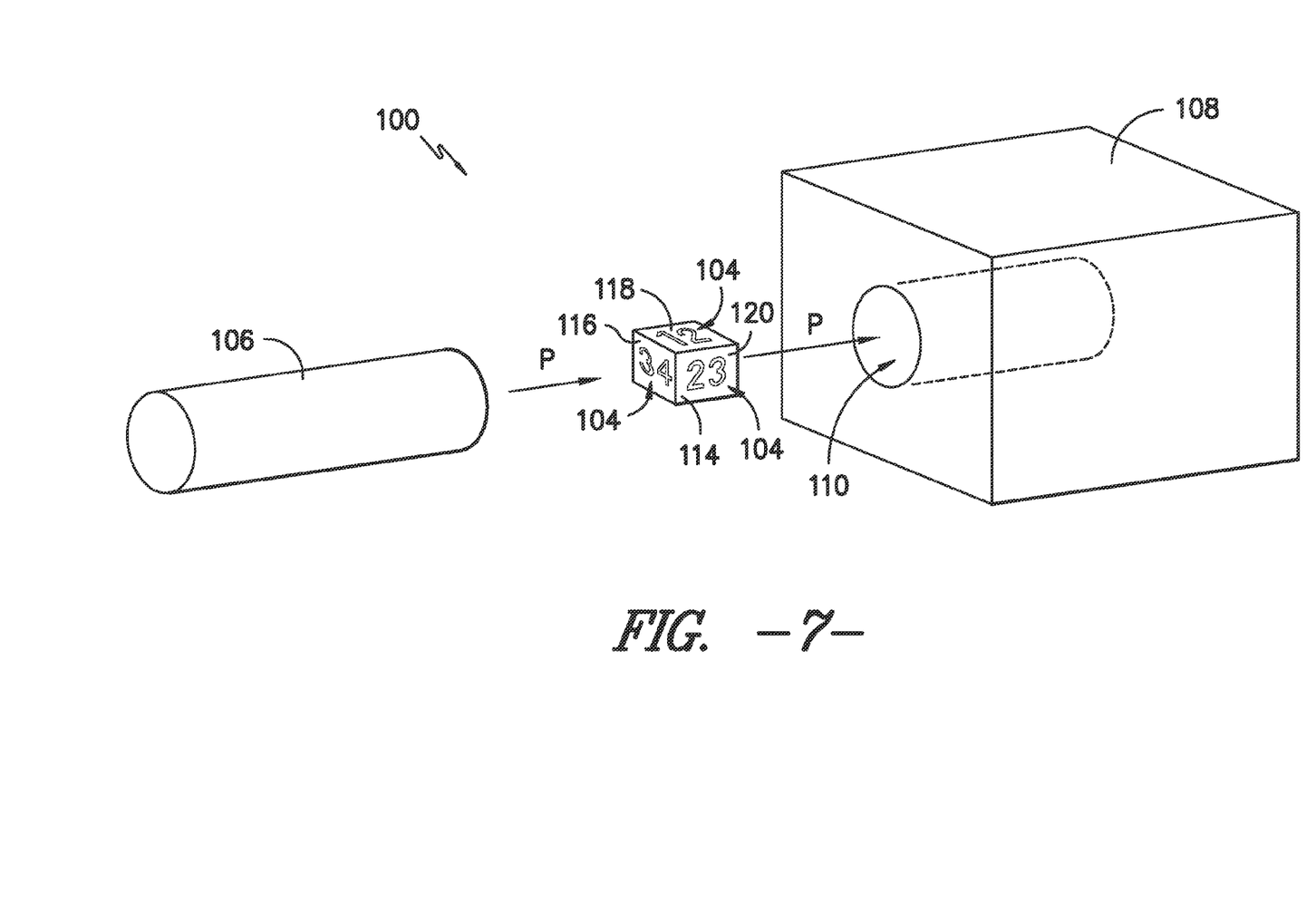
FIG. 7 illustrates an exploded perspective view of another exemplary embodiment and method of the present invention.

FIG. 7 illustrates another exemplary embodiment and method of the present invention in an exploded perspective view. In a manner similar to the embodiments of FIGS. 1 and 2, a target object 100 is assembled from a first component 106 and a second component 108 by a press fit into opening 110 and may also be welded, glued, or the like. Again, components 106 and 108 could be functioning parts of a target object 100 such as e.g., a gun, engine, or other device. For this embodiment, multiple identification symbols 104 are placed on a carrier 114 in different planes represented by faces 116, 118, 120 and reverse faces of carrier 114. Symbols 104 may be placed by engraving and an X-ray contrasting agent 112 as described above may be employed as well.

The carrier 114 is embedded into target object 100 by being placed into opening 110 and then concealed by the permanent insertion of first component 106 thereafter. Although shown as a cube, carrier 114 may be constructed from a variety of different objects such as a cylinder, pyramid, and others. By placing the identification symbols 104 on multiple, non-parallel planes as shown in FIG. 7, a single X-ray image cannot be used subsequently to determine or reveal the identification symbols 104. Instead, X-rays from multiple different angles corresponding to the different faces 116, 118, and 120 are required.

Figure 8:
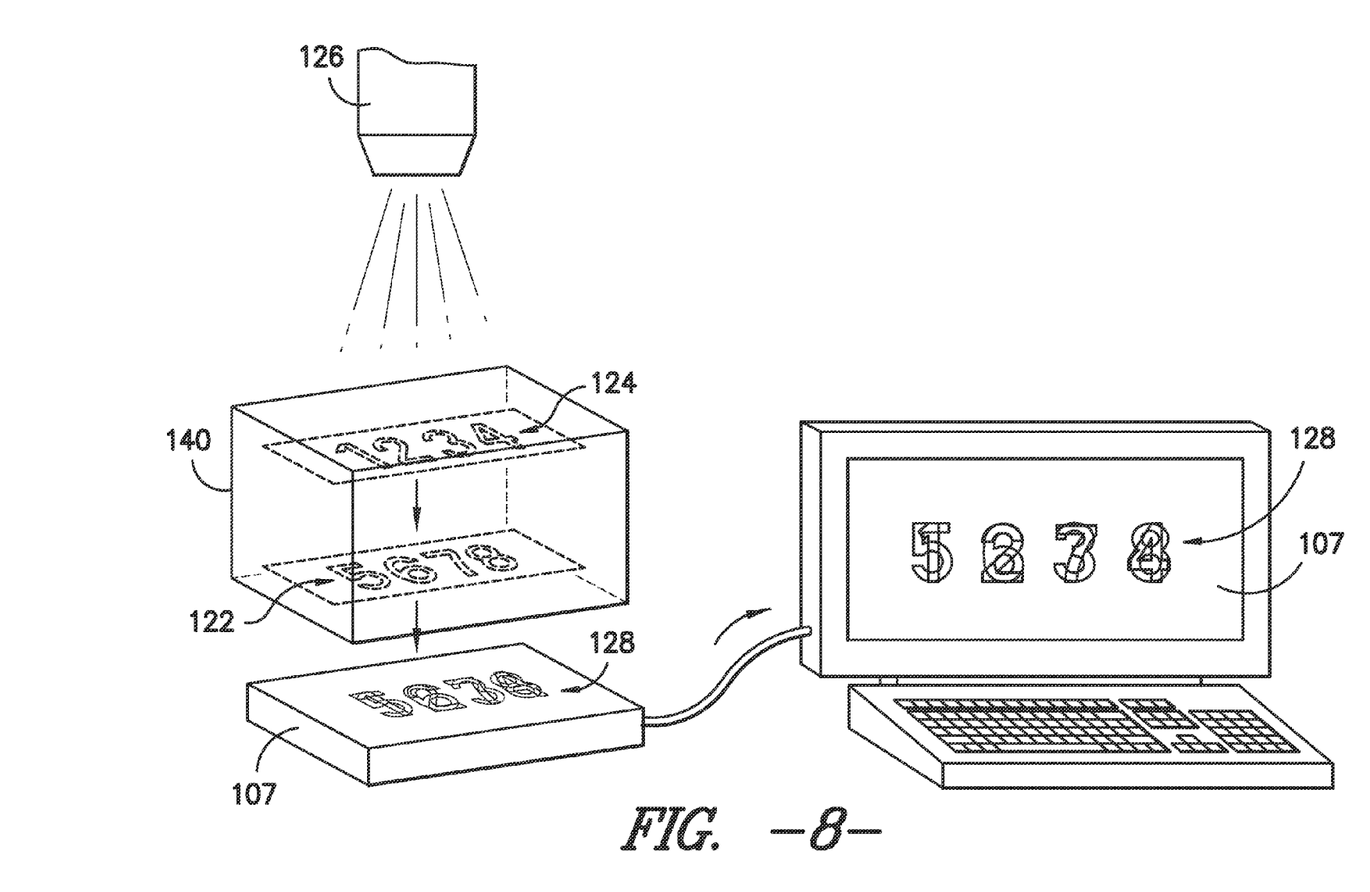
FIGS. 8-10 provide perspective views illustrating additional exemplary embodiments for concealing identification symbols and methods of the present invention.

FIG. 8 illustrates another exemplary embodiment and method of the present invention in which identification symbols 122 and 124 have been incorporated into a block 140 in different planes. The block may be fabricated using powder metallurgy or vapor deposition, such that identification symbols are embedded in the solid in an overlapping pattern. More specifically, a single X-ray generating source or device 126 is used to project the X-rays through 124 and 122 onto imaging plate 107 and the resulting image is not easily read. This configuration requires multiple X-ray images and computed tomography (CT) reconstruction. Next, the X-rays from device 126 pass through identification symbols 122 in a second plane onto imaging plate 107—wherein the first plane and second plane of symbols 122 and 124 overlap and are adjacent and parallel to each other. As result, a three-dimensional code is created by the superimposed symbols 130. The image on imaging plate 107 cannot be read with a single X-ray image or view but requires multiple images at differing angles reconstructed using computed tomography methodologies.

Figure 9:
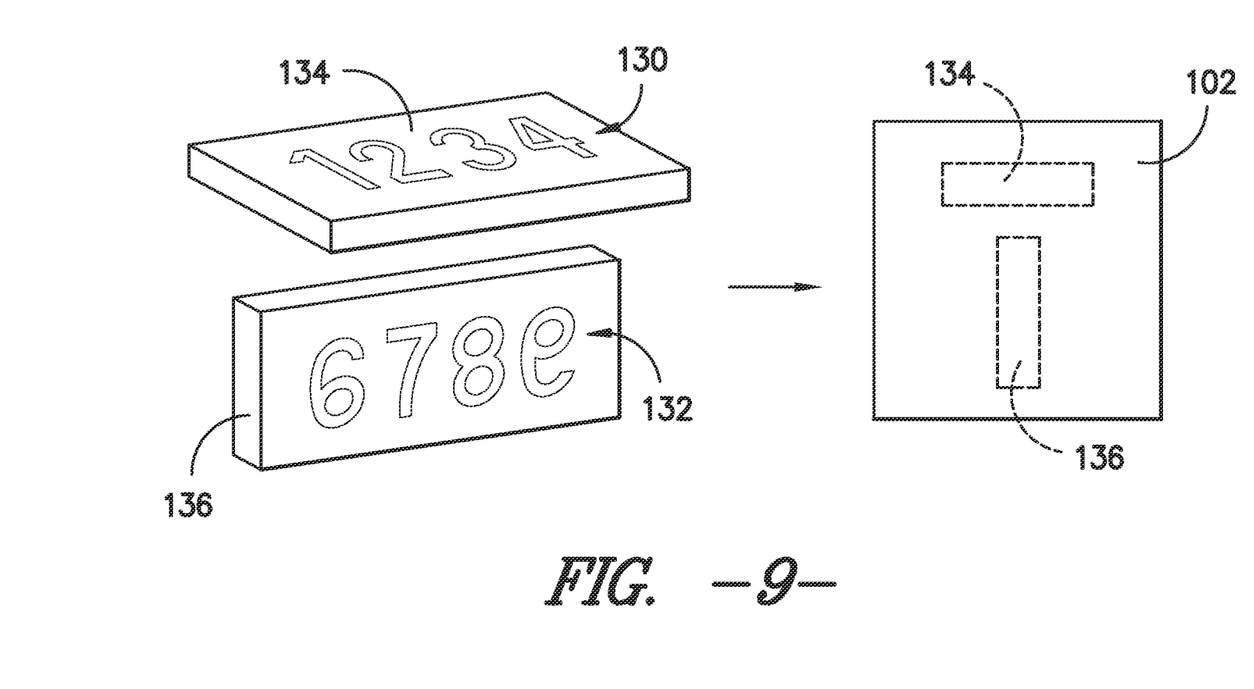

Another exemplary method of the present invention is illustrated in FIG. 9. For this embodiment, a first set of identification symbols 130 are positioned in a first plane such as a plate 134, and a second set of identification symbols 132 are positioned in a second plane such as plate 136. As shown, plates 134 and 136 are not coplanar or parallel to each other. Although shown as orthogonal to each other, plates 134 and 136 may positioned at other non-zero angles as well. By way of example, symbols 130 and 132 could be engraved, could be formed with an X-ray contrasting agent, could be deposited by vapor deposition, and/or other techniques could be used as well.

As also shown in the exemplary embodiment of FIG. 9, plates 134 and 136 are embedded into a target object 102 such that they are concealed from the human eye and cannot be so viewed without disassembly and/or destruction of target object 102. Additionally, because the identification symbols 130 and 132 are positioned in different, non-parallel planes, by using an identification code that incorporates both symbols 130 and 132, a single X-ray cannot be used to determine such a code once symbols 130 and 132 are embedded. Instead, as previously described, symbols 130 and 132 must be determined through multiple X-ray images taken at different angles to target object 102 and then compiled using one or more algorithms into a form whereby the symbols can be determined so that the identification code is revealed.

Figure 10:
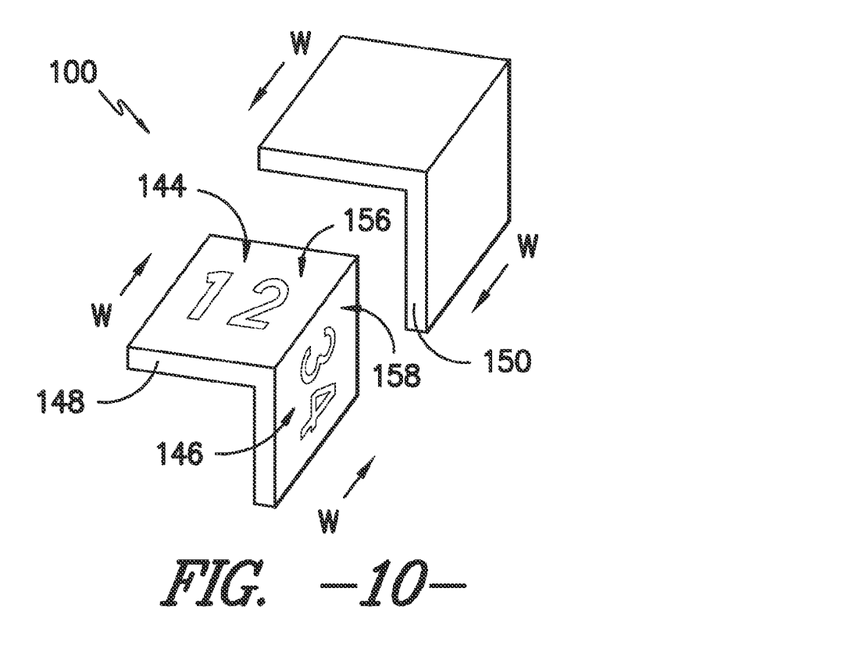

FIG. 10 illustrates another exemplary embodiment and method of the present invention in which identification symbols 144 and 146 are placed on non-parallel planes 156 and 158 of a first component 148 which is combined e.g., by welding (arrows W) or some other permanent technique with a second component 150 to create a target object 100. Consequently, identification symbols 144 and 146 are embedded in target object 100, are not visible to the unaided human eye and cannot be so viewed without disassembly and/or destruction of target object 100.

Figure 11:
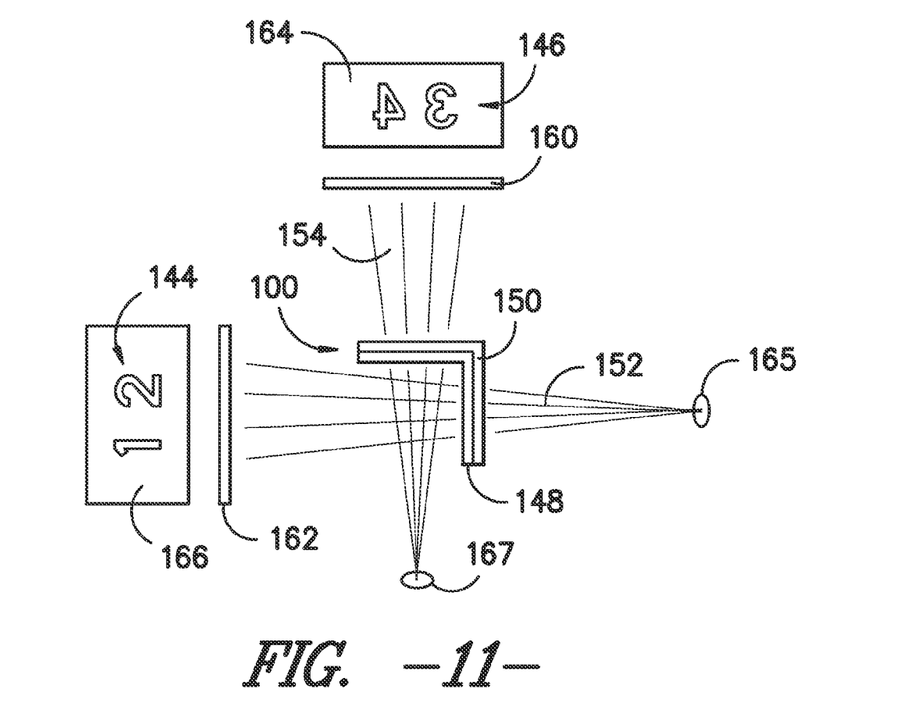
FIG. 11 illustrates an exemplary method for determining concealed identification symbols of an exemplary embodiment of the present invention.

A single X-ray cannot be used to reveal both sets of symbols 144 and 146, which can be used together as a single identification code. Thus, FIG. 11 illustrates schematically an example of using X-rays from multiple angles to determine identification symbols 144 and 146. An X-ray source 165 is used to project X-rays 152 through first plane 156 to 162, imaging plate, film, scintillator or the like, which in turn provides image 166 of identification symbols 144. Similarly, 167, the same X-ray source is repositioned or an additional X-ray source, is used to project X-rays 154 through first plane 158 to 160, imaging plate, film, scintillator or the like, to reveal image 164 of identification symbols 146. FIG. 11 is provided by way of example only. Other techniques could be used as well.

Figure 12:
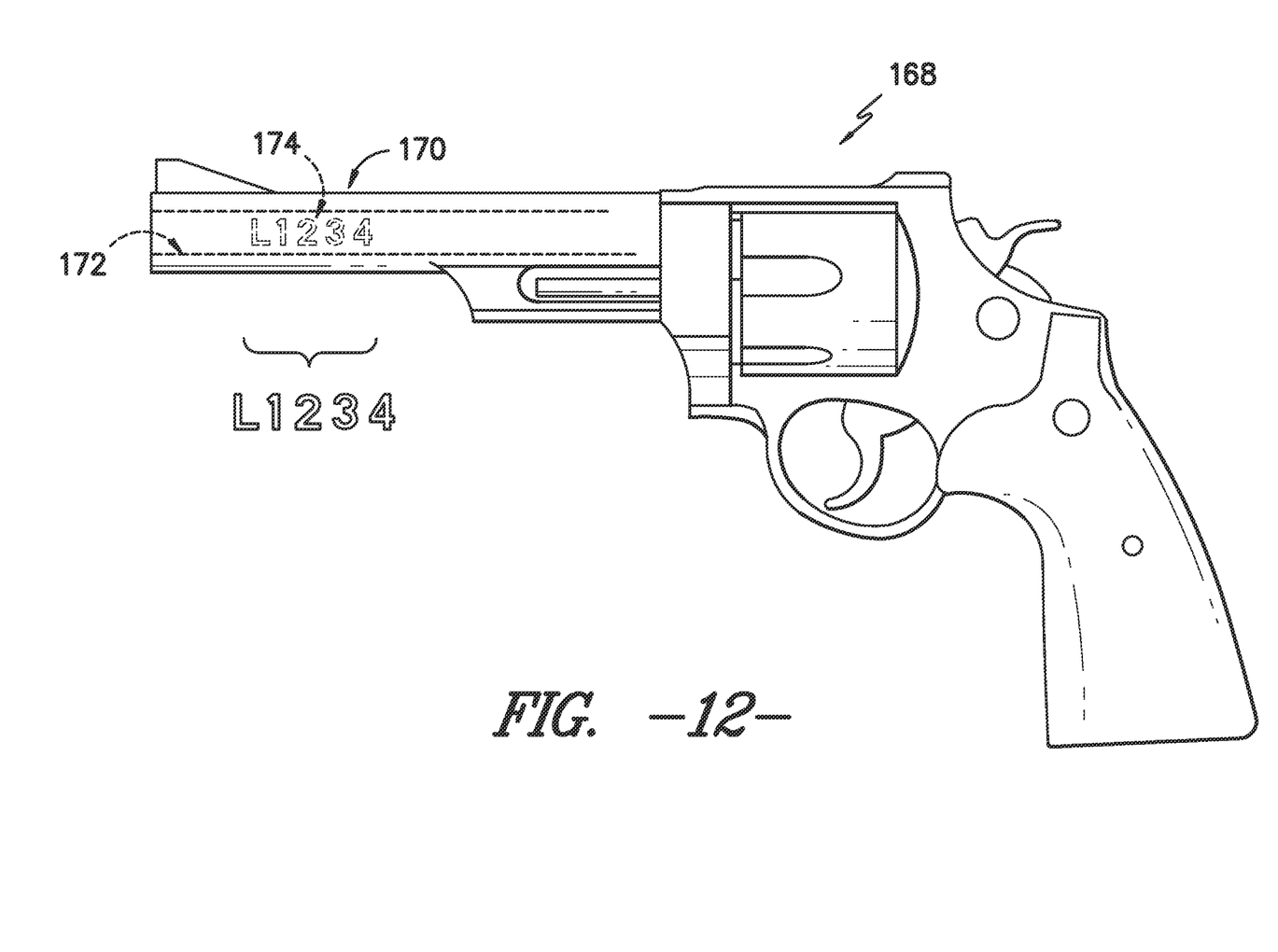
FIG. 12 depicts an exemplary embodiment of a target object of the present invention into which identification codes have been concealed and embedded.

FIG. 12 provides an exemplary embodiment of a gun 168 as a target object into which identification symbols 174 have been embedded onto the curved inner surface 172 of barrel 170. As such, identification symbols 174 are hidden from viewing by the human eye unless the gun is destroyed by e.g., cutting the barrel 170 in half along its axis. Furthermore, a single X-ray cannot reveal symbols 174 because of their location on the curved inner surface of barrel 170 with low contrast requiring computed tomography to obtain the identification symbols. FIG. 12 is provided by way of example only. Other target objects may be embedded with one or more identification symbols as previously described.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of concealed identification, the steps comprising:

embedding one or more identification symbols into the target object such that the one or more identification symbols are not visible to the human eye from the outside of the object, cannot be revealed without disassembling the object, and cannot be identified using a single X-ray image;

obtaining multiple X-ray images of the one or more identification symbols in the object;

applying one or more algorithms to multiple X-ray images from said step of obtaining; and, determining the identification symbols from said step of embedding using the results of said step of applying.

2. A method of concealed identification as in claim 1, wherein said embedding step uses multiple identification symbols to create an identification code, and wherein said step of embedding comprises placing the identification symbols in different planes within the object such that the entire identification code is not located in a single plane.

3. A method of concealed identification as in claim 2, wherein said different planes are layered.

4. A method of concealed identification as in claim 1, wherein said embedding step uses multiple symbols to create an identification code, and wherein said embedding step comprises placing the symbols in different, non-parallel planes within the object such that the entire identification code is not located in a single plane.

5. A method of concealed identification as in claim 1, wherein said step of obtaining comprises subjecting the object to multiple X-rays from different angles.

6. A method of concealed identification as in claim 1, wherein said step of embedding comprises engraving the one or more identification symbols onto a curved surface.

7. A method of concealed identification as in claim 1, wherein said step of embedding comprises:

locating the one or more identification symbols on a first component of the target object; and combining the first component with a second component of the target object in a permanent manner such that the target object must be partially or totally destroyed to access the one or more identification symbols.

8. A method of concealed identification as in claim 7, wherein said step of combining step comprises press fitting the first component and second component together to create an interference fit that covers at least part of the identification symbols.

9. A method of concealed identification as in claim 7, wherein said step of combining comprises welding the first component and the second component together, 10. A method of concealed identification as in claim 1, wherein said step of embedding comprises placing the one or more identification symbols onto a carrier and concealing the carrier inside the target object.

11. A method of concealed identification as in claim 1, wherein said step of embedding comprises creating the one more identification symbols using vapor deposition, plasma deposition, powdered metallurgy, rapid prototyping or 3D printing.

12. A method of concealed identification as in claim 1, wherein said step of embedding comprises using an X-ray contrasting agent to form the one or more identification symbols.

13. A method of concealed identification as in claim 1, further comprising the step of placing one or more decoy identification symbols onto the target object that are visible to the human eye from outside the object.

14. A method of concealed identification as in claim 1, wherein said step of applying comprises the use of computerized tomography from multiple X-ray images.

* * * * *